US008867613B2

(12) United States Patent
Joshi (10) Patent No.: US 8,867,613 B2
(45) Date of Patent: Oct. 21, 2014

(54) METHOD AND APPARATUS FOR RATE CONTROL FOR COMPRESSION OF VIDEO FRAMES

(75) Inventor: Rajan Laxman Joshi, San Diego, CA (US)

(73) Assignee: Thomson Licensing, Issy les Moulineaux (FR)

( * ) Notice: Subject to any disclaimer, the term of this patent is extended or adjusted under 35 U.S.C. 154(b) by 698 days.

(21) Appl. No.: 13/138,042

(22) PCT Filed: Dec. 21, 2009

(86) PCT No.: PCT/US2009/006683
§ 371 (c)(1),
(2), (4) Date: Jun. 27, 2011

(87) PCT Pub. No.: WO2010/077333
PCT Pub. Date: Jul. 8, 2010

(65) Prior Publication Data
US 2011/0268181 A1    Nov. 3, 2011

Related U.S. Application Data

(60) Provisional application No. 61/203,799, filed on Dec. 29, 2008.

(51) Int. Cl.
| | |
|---|---|
| H04N 7/12 | (2006.01) |
| G06K 9/36 | (2006.01) |
| H04N 19/15 | (2014.01) |
| H04N 19/61 | (2014.01) |
| H04N 19/63 | (2014.01) |
| H04N 19/124 | (2014.01) |
| H04N 19/132 | (2014.01) |
| H04N 19/587 | (2014.01) |
| H04N 19/192 | (2014.01) |
| H04N 19/172 | (2014.01) |

(52) U.S. Cl.
CPC ... *H04N 19/00127* (2013.01); *H04N 19/00187* (2013.01); *H04N 19/00781* (2013.01); *H04N 19/00818* (2013.01); *H04N 19/0009* (2013.01); *H04N 19/00751* (2013.01); *H04N 19/00357* (2013.01); *H04N 19/00266* (2013.01)
USPC .................................. 375/240.03; 382/235

(58) Field of Classification Search
CPC .................. H04N 7/26085; H04N 7/26244
USPC ........ 375/240.02, 240.03; 382/235, 246, 248, 382/251; 341/50
See application file for complete search history.

(56) References Cited

U.S. PATENT DOCUMENTS

| | | | |
|---|---|---|---|
| 5,838,826 A | 11/1998 | Enari et al. | |
| 6,349,151 B1 * | 2/2002 | Jones et al. | 382/251 |

(Continued)

FOREIGN PATENT DOCUMENTS

| | | |
|---|---|---|
| EP | 1173025 | 1/2002 |
| WO | WO2006085301 | 8/2006 |

(Continued)

*Primary Examiner* — Gims Philippe
(74) *Attorney, Agent, or Firm* — Robert D. Shedd; Ronald J. Kolczynski (57) ABSTRACT

A method and apparatus for controlling the rate of compression in video/image compression environments is provided. The method includes determining a scaling factor that results in a compressed file size as close to a target file size as possible. In determining the scaling factor, tolerance limits of the current file size as compared with a predetermined tolerance is made, and when the tolerance is not met, the current scaling factor is interpolated to generate a new scaling factor, and consideration of a ratio of file sizes is made to determine if a new downsampling factor is needed for the interpolated scaling factor.

4 Claims, 5 Drawing Sheets

(56) References Cited

U.S. PATENT DOCUMENTS

| | | | |
|---|---|---|---|
| 6,356,668 B1 * | 3/2002 | Honsinger et al. | 382/251 |
| 6,504,494 B1 * | 1/2003 | Dyas et al. | 341/50 |
| 6,614,942 B1 * | 9/2003 | Meier | 382/251 |
| 6,668,089 B1 | 12/2003 | Bracamonte et al. | |
| 6,931,159 B2 * | 8/2005 | Ridge | 382/246 |
| 6,937,770 B1 * | 8/2005 | Oguz et al. | 382/235 |
| 7,567,722 B2 * | 7/2009 | Liu et al. | 382/248 |
| 2003/0161542 A1 | 8/2003 | Ridge | |
| 2004/0146214 A1 | 7/2004 | Marks | |
| 2007/0116126 A1 | 5/2007 | Haskell et al. | |

FOREIGN PATENT DOCUMENTS

| | | |
|---|---|---|
| WO | WO2006102571 | 9/2006 |
| WO | WO2008051517 | 5/2008 |

* cited by examiner

METHOD AND APPARATUS FOR RATE CONTROL FOR COMPRESSION OF VIDEO FRAMES

CROSS REFERENCE TO RELATED APPLICATIONS

This application claims the benefit, under 35 U.S.C. §365 of International Application PCT/US2009/006683, filed Dec. 21, 2009, which was published in accordance with PCT Article 21(2) on Jul. 8, 2010 in English and which claims the benefit of U.S. provisional patent application No. 61/203,799, filed Dec. 29, 2008.

TECHNICAL FIELD

The present principles relate to video compression. More particularly, it relates to methods for achieving a target file size for compressed video.

BACKGROUND

One of the ways of achieving a target file size for compressed video is to use a scaled version of a fixed quantization table for compressing frames in the sequence. The quantization table is usually designed by taking the properties of the human visual system into account. But, the compressed file size can not be accurately predicted from the quantization table and the scaling factor. In some applications, it is necessary to achieve a compressed file size that is within a specified tolerance of the target file size. We propose a method and apparatus for finding a scaling factor to achieve the target file size within a specified tolerance in a computationally efficient manner.

In many applications, there is a requirement that the overall file size of the compressed video is within a specified tolerance interval of a target file size.

SUMMARY

According to an implementation, the method for rate control for compression of video frames includes specifying a target compressed file size and file size tolerance, compressing a subset of a total number of video frames to obtain an estimate of compressed file size for all frames in a sequence, determining if an overall compressed files size is within a tolerance limit, iteratively performing a scaling factor determination when the overall compressed file size is not within the tolerance limit, and selecting a scaling factor that results in a compressed file size as close to a target file size as possible.

The compressing of a subset of a total number of video frames to obtain an estimate of compressed file size for all frames in a sequence may further include initially electing a quantization table, a current scaling factor and a current downsampling factor for use in during the compressing.

The interative scaling factor determination may further include updating a current scaling factor using interpolation, and setting a new downsampling factor based on a predetermined ratio of file sizes when the ratio leads to a lower downsampling factor.

In accordance with another implementation, the apparatus for rate control for compression of video frames includes a system having a processor and one or more memory devices. The processor and at least one memory device is configured to perform the steps for rate control for compression of video frame as described above.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to video/image compression techniques.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In many applications, there is a requirement that the overall file size of the compressed video is within a specified tolerance interval of a target file size. In the JPEG2000 standard (Information Technology—JPEG2000 Image Coding System, ISO/IEC International Standard 15444-1, ITU Recommendation T.800) many different approaches are possible for achieving this goal. Some representative examples of these approaches are:

1. Use a constant number of bits to compress each frame so that the target file size is almost exactly achieved;
2. Use external bit allocation based on human visual system, feature maps, complexity, etc., to allocate bits to different frames and to different areas within a frame so that the target file size is achieved with a specified tolerance;
3. Choose a quantization table to be used for compressing each frame; and then determine a scaling factor for the quantization table, such that the target file size is achieved within a specified tolerance. In the JPEG2000 context, the quantization table refers to the individual quantizer step-sizes used to quantize each subband; and
4. Determine a rate-distortion slope parameter for discarding coding passes such that the target file size is achieved with a specified tolerance.

The exact method chosen depends on the specific application and requirements. The quantization table in approach 3 can be chosen based on the properties of the human visual system (HVS). Experience suggests that approach 3 results in roughly similar visual quality for different frames in the video sequence, and hence, is used in one exemplary embodiment. When approach 3 is used, it is desirable to determine a scaling factor such that the overall compressed file size is equal to the target file size within a specified tolerance. Each quantization table entry is multiplied by the scaling factor to derive the actual quantization table. Determining the exact scaling factor needed analytically is difficult, as there is no direct relationship between the scaling factor and the compressed file size. The present invention proposes a computationally efficient method to determine this scaling factor.

Throughout the following description of the exemplary implementation of the invention, it is assumed that each frame is compressed independently using JPEG2000 or any other compression algorithm. Thus, the overall compressed file size refers to the sum of the compressed file sizes for individual frames. Those skilled in the art will recognize that it may be possible to concatenate individual compressed frames into a single compressed file for the entire video. This is especially true at the final iteration and at any other instance when each frame from the video sequence is being compressed.

Figure 1:
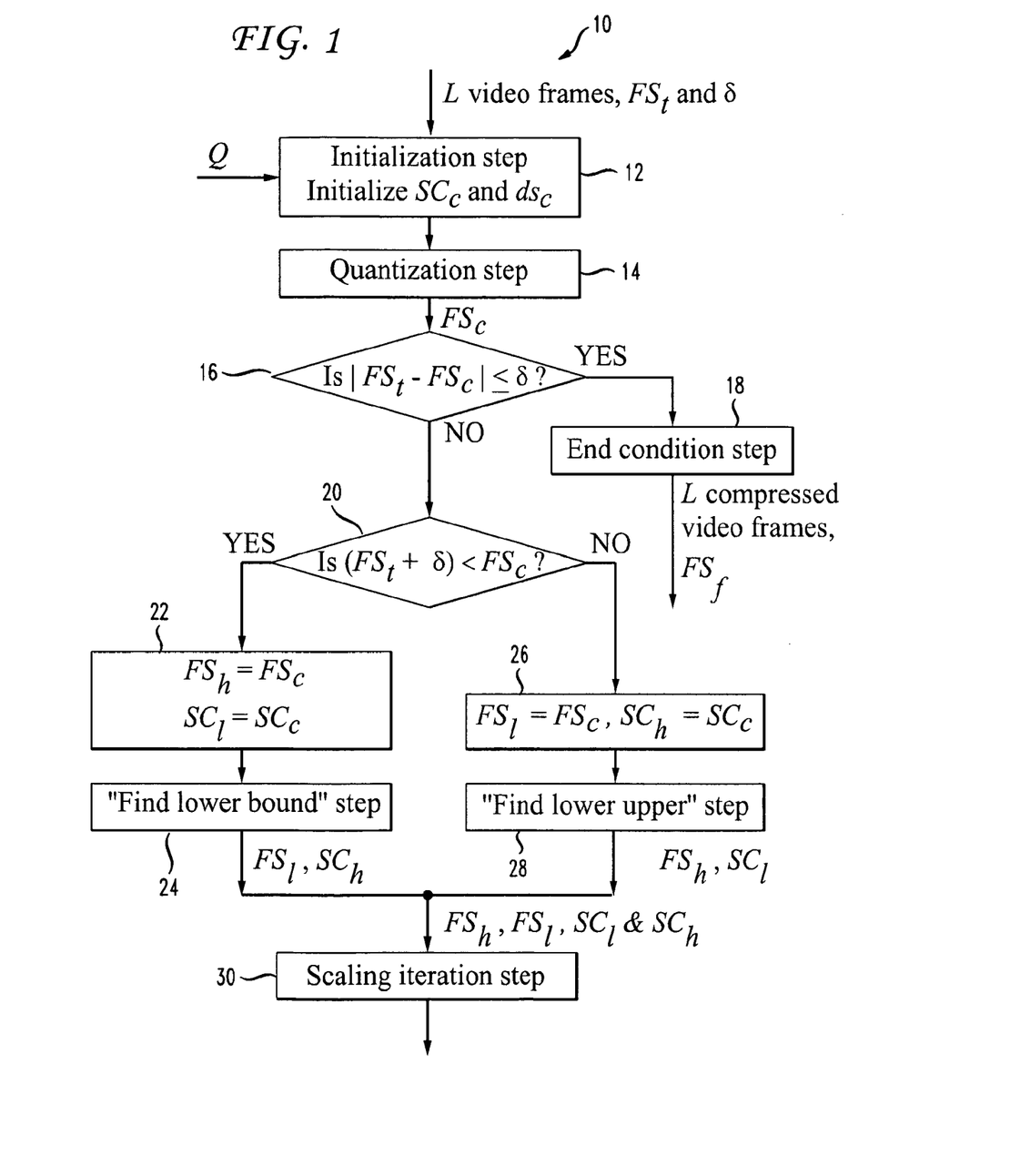
FIG. 1 is flow chart of the method for determining a scaling factor according to an implementation of the present invention.

FIG. 1 shows a flowchart 10 for determining the scaling factor according to an implementation of the present invention. The total number of video frames=L. The target compressed file size=$FS_t$ and the file size tolerance=$\pm\delta$%. The values of $FS_t$ and $\delta$ are user-specified. In the initialization step 12, a quantization table (Q), current scaling factor ($SC_c$), and a current downsampling factor ($ds_c$) is chosen. The quantization table Q is typically chosen based on a contrast sensitivity model of the human visual system (HVS), but it can also be user-specified. The "quantization (compression) step 14 compresses up to L video frames using the quantization table Q, scaled by the scaling factor $SC_c$. The overall compressed file size after this step (14)=$FS_c$. At step 16, it is determined if $FS_c$ is within the tolerance limit, that is, if $|FS_t-FS_c|\leq\delta$. If yes, an "end condition" step 18 is executed. In this step 18, every video frame that was not compressed in the previous compression step is compressed using the quantization table Q, scaled by the current scaling factor $SC_c$ and the process is stopped. The resulting final overall compressed file size is $FS_f$. If at step 16, $FS_c$ is not within the tolerance limit, a subsequent determination is made at step 20, as to whether $FS_t+\delta<FS_c$? If yes, $FS_h$ is set to $FS_c$ and $SC_l$ is set to $SC_c$. Then, values of $FS_l$ and $SC_h$ are found in the "find lower bound" step 24. $FS_h$, $FS_l$, $SC_l$, and $SC_h$ represent "file size high", "file size lower", "scaling factor lower", and "scaling factor high." It is important to recognize that lower values of SC correspond to less aggressive quantization and hence higher compressed file sizes. Otherwise, if $(FS_t-\delta)>FS_c$ (i.e., no at step 20), $FS_l$ is set $FS_c$ and $SC_h$ is set to $SC_c$ (at step 26). Then, values of $FS_h$ and $SC_l$ are found in "find upper bound" step 28. The values, $FS_l$, $FS_h$, $SC_l$ and $SC_h$ are input to a "scaling factor iteration" step 30.

Figure 2:
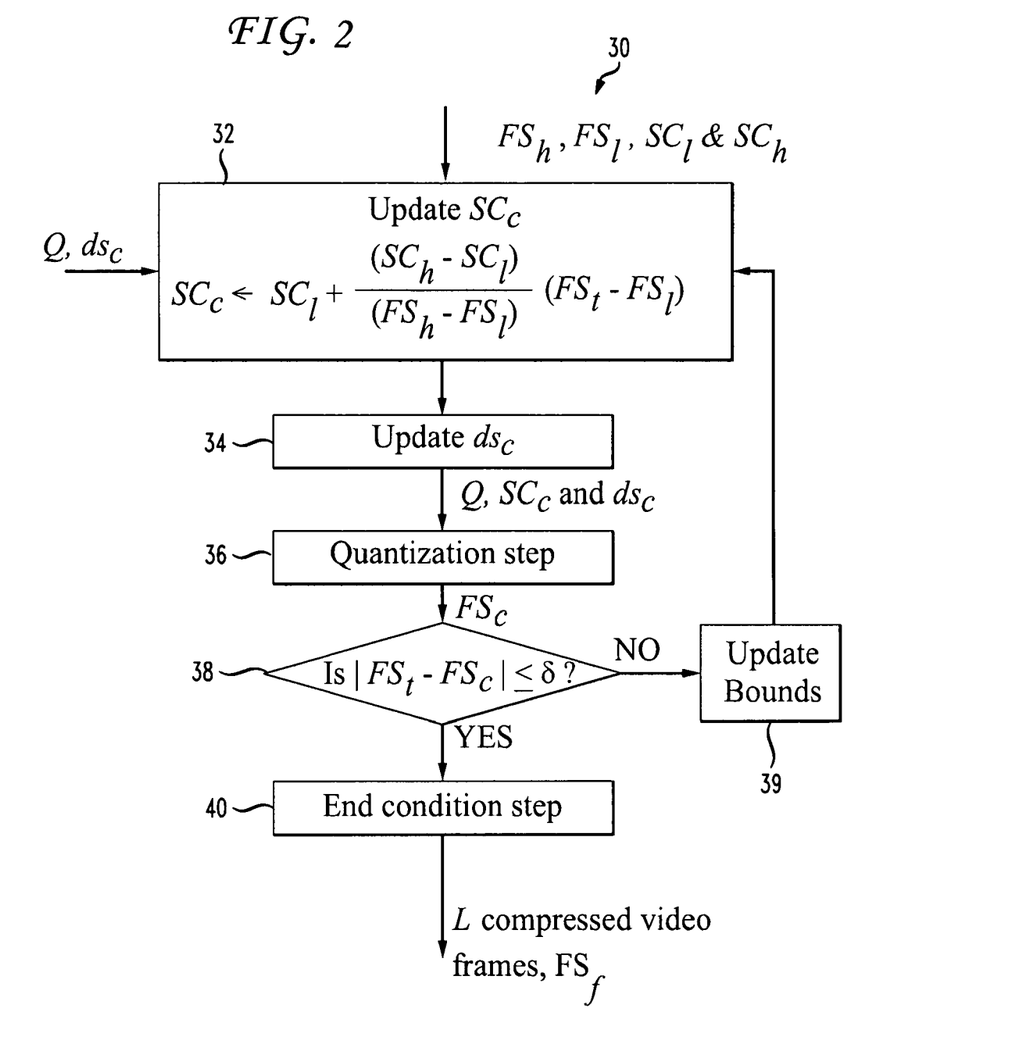
FIG. 2 is a flow chart of the scaling factor iteration according to an implementation of the present invention.

The details of the "scaling factor iteration" step 30 are shown in FIG. 2. In this step, $SC_c$ is updated (32) using linear interpolation, although other interpolation methods are possible based on the modeling of the dependence of overall compressed file size on the scaling factor. In a preferred embodiment, $SC_c$ is updated as $$SC_c = SC_l + \frac{(SC_h - SC_l)}{(FS_h - FS_l)}(FS_t - FS_l).$$

A new value for downsampling factor $ds_c$ is also set (34) based on the ratio $(FS_h-FS_l)/FS_t$, only if it leads to a lower downsampling factor. Those of skill in the art will recognize that the basic idea is that initially, the downsampling factor can be large, resulting in very few frames being compressed. But as the above ratio decreases, i.e. the gap between $FS_l$ and $FS_h$ narrows, the downsampling factor becomes smaller, resulting in more frames being encoded. Then, the quantization table Q, the updated parameters scaling factor $SC_c$, and the downsampling factor $ds_c$ are input to the compression (quantization) step (36). The compression step produces a new estimated compressed file size. If $FS_c$ is within the tolerance limit, the flow control passes to the "end condition" step 40. Otherwise in the "update bounds" step (39), $FS_c$ is compared with $FS_t$. If $FS_c<FS_t$, $FS_l$ is set to $FS_c$ and $SC_h$ is set to $SC_c$. Otherwise, if $FS_c>FS_t$ (i.e., is not within the tolerance limit), $FS_h$ is set to $FS_c$ and $SC_l$ is set to $SC_c$. Then, the flow control is returned to the beginning of the "scaling factor iteration" step 32. In rare cases, $FS_c$ may fall outside the interval $[FS_l, FS_h]$ resulting in a widening of the interval after the update. This can happen only when the downsampling factor has been updated. In practice, if this condition occurs, it gets corrected quickly in the subsequent scaling factor iterations The quantization (compression) step (i.e., step 36) is now described in greater detail. The input to the quantization step are L video frames, $ds_c$, Q, $SC_c$. The remainder after dividing L by $ds_c$=r. Then, an offset is chosen at random such that 0≤offset<r. The video frames are be indexed from 0 to L−1. Then, the number of frames that are compressed in the compression step is calculated as $$L_c = \left\lfloor \frac{L - \text{offset} - 1}{ds_c} \right\rfloor + 1.$$

The indices of the frames that are compressed are given by $n \times ds_c + \text{offset}$, where $0 \leq n < L_c$. Each such frame is compressed using quantizer table Q scaled by the updated $SC_c$. The sum of the file sizes of the compressed frames is set to be $FS_{ds}$. Then, the overall compressed file size is estimated to be $FS_c = FS_{ds} \times (L/L_c)$. Instead of choosing the offset at random, it is possible to choose a fixed value such as 0.

Figure 3:
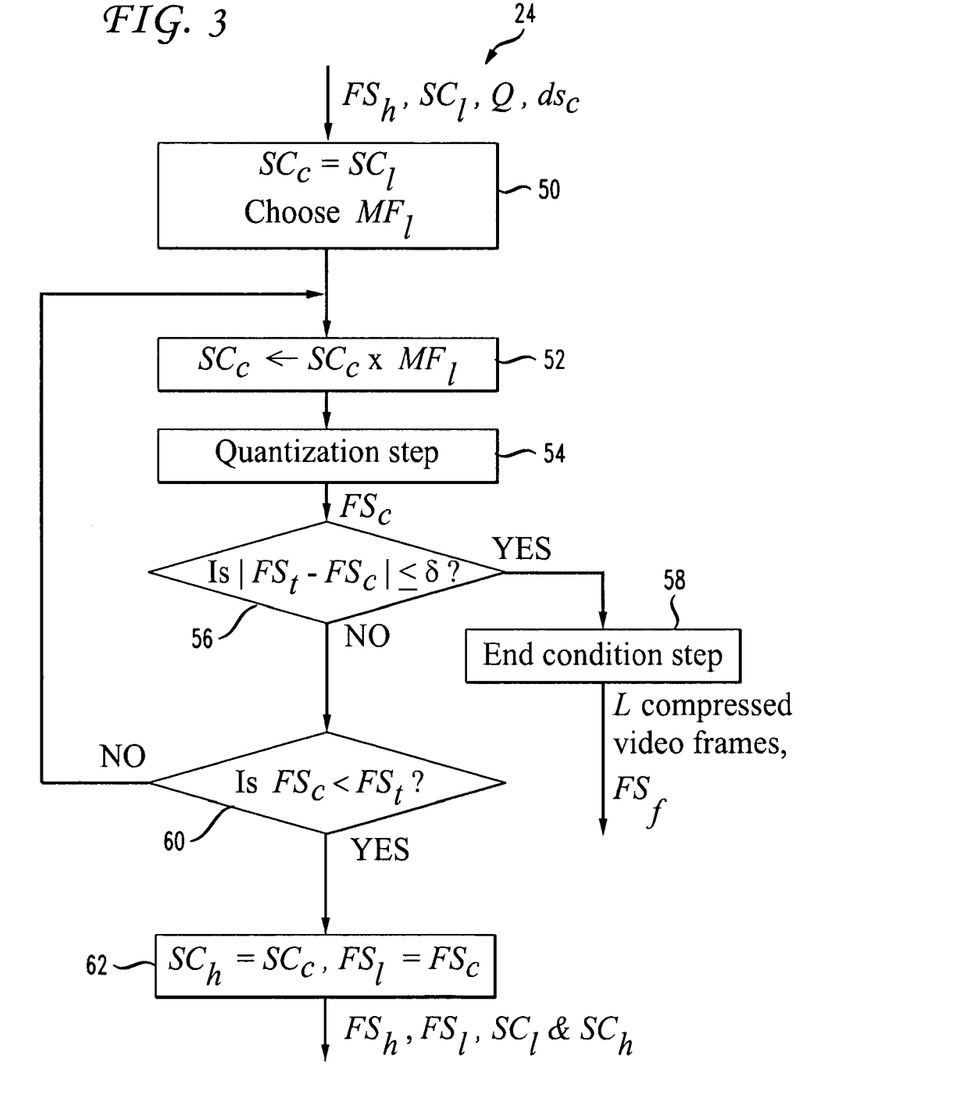
FIG. 3 is a flow chart of the finding a lower bound in the scaling factor determination according to an implementation of the present invention.

The "find lower bound" step 24 is now described in greater detail. The flow diagram for this step is shown in FIG. 3. When executing this step, $FS_h$ and $SC_l$ are already set and we are trying to determine $FS_l$ and the corresponding $SC_h$ such that $FS_l<FS_t$. First, scaling factor $SC_c$ is initialized to $SC_l$ and a multiplication factor $MF_l$ is chosen (step 50). This is greater than 1.0 and can be user-specified or a function of $(FS_h-FS_t)/FS_t$. In one exemplary embodiment, a multiplication factor of 1.5 can be used. Then, $SC_c$ is set to $SC_c \times MF_l$ (step 52). Compression is performed using the compression step 54 with quantization table Q, scaling factor $SC_c$, and downsampling factor $ds_c$ to produce an estimate $FS_c$ for the overall compressed file size. At step 56, a determination is made whether $FS_c$ is within the tolerance limit. If yes, the flow control passes to the "end condition" step 58. If not within the tolerance limit, a subsequent determination is made as to whether or not $FS_c<FS_t$? If $FS_c>FS_t$, flow control is returned to the beginning of the "find lower bound" step 24. If $FS_c<FS_t$, $FS_l$ is set to $FS_c$ and $SC_h$ is set to $SC_c$ (step 60) and the flow control is passed to the "scaling factor iteration" step 30 with parameters $FS_l$, $FS_h$, $SC_l$ and $SC_h$.

Figure 4:
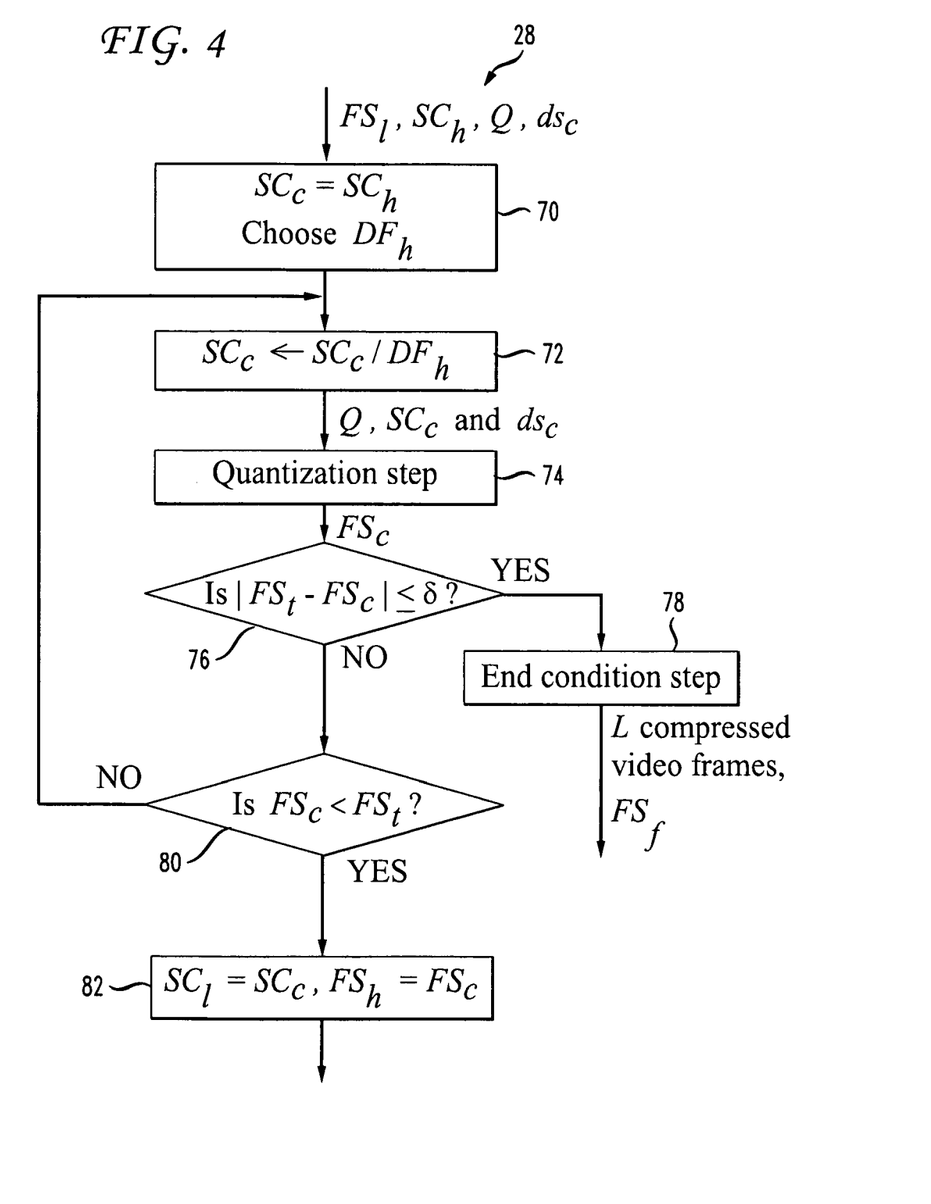
FIG. 4 is a flow chart of the finding of an upper bound in the scaling factor determination according to an implementation of the present invention.

The "find upper bound" step 28 is now described in greater detail. The flow diagram for this step is shown in FIG. 4. When executing this step, $FS_l$ and $SC_h$ are already set and we are trying to determine $FS_h$ and the corresponding $SC_l$ such that $FS_t<FS_h$. First, scaling factor $SC_c$ is initialized to $SC_h$ and a division factor $DF_h$ is chosen (step 70). This is between 0 and 1 and can be user-specified or a function of $(FS_t-FS_l)/FS_t$. In a preferred embodiment, a division factor of 1/1.5 is used. Then, $SC_c$ is set to $SC_c/DF_h$ (step 72). Compression is performed using the compression step 74 with quantization table Q, scaling factor $SC_c$, and downsampling factor $ds_c$ to produce an estimate $FS_c$ for the overall compressed file size. A determination is then made (step 76) as to whether $FS_c$ is within the tolerance limit. If yes, the flow control passes to the "end condition" step 78. If no, a subsequent determination is made (step 80) whether $FS_t>FS_c$? If no, flow control is returned to the beginning of the "find upper bound" step. If yes, $FS_h$ is set to $FS_c$ and $SC_l$ is set to $SC_c$ (step 82) and the flow control is passed to the "scaling factor iteration" step 30 with parameters $FS_l$, $FS_h$, $SC_l$ and $SC_h$.

It should be noted that the flow control can terminate only through the "end condition" step. Also, it is not guaranteed that the final compressed file size is within the tolerance interval. This is because the stop decision may be arrived at based on a downsampling factor that is greater than 1, whereas the final compression step compresses all the frames (ds=1).

If ds=1 and offset=0 is used as the initial value, then the downsampling factor remains constant throughout. In that case, the algorithm is much simplified and is guaranteed to produce an overall compressed file size within the tolerance limits of the target file size.

In JPEG2000 it is common to use a rate-distortion parameter to determine the compressed coding pass data that is included in the final code-stream ("JPEG2000: Image Compression Fundamentals, Standards and Practice," David S. Taubman and Michael W. Marcellin, Springer 2002). In that case, instead of finding a scaling factor that achieves the target compressed file size, we are trying to find a rate-distortion slope parameter that produces the target compressed file size. Those skilled in the art will realize that instead of iterating on the scaling factor, it would be possible to iterate on the rate-distortion slope parameter to achieve the overall target compressed file size.

It is possible to apply this method to the rate-control of AVC H.264 intra-only bit-streams (ISO/IEC 14496-10:2003, "Coding of Audiovisual Objects—Part 10: Advanced Video Coding," 2003, also ITU-T Recommendation H.264 "Advanced video coding for generic audiovisual services). Some profiles in H.264 offer an option to use custom Q-tables. Additionally, AVC H.264 offers the flexibility of choosing a quantization parameter QP that can be varied from one macroblock to another. But it may be desirable to maintain the value of QP constant throughout the video. In such a case, those skilled in the art will recognize that the present method can be applied for performing rate-control. This scenario is more restrictive, since only QP can take only integer values.

Figure 5:
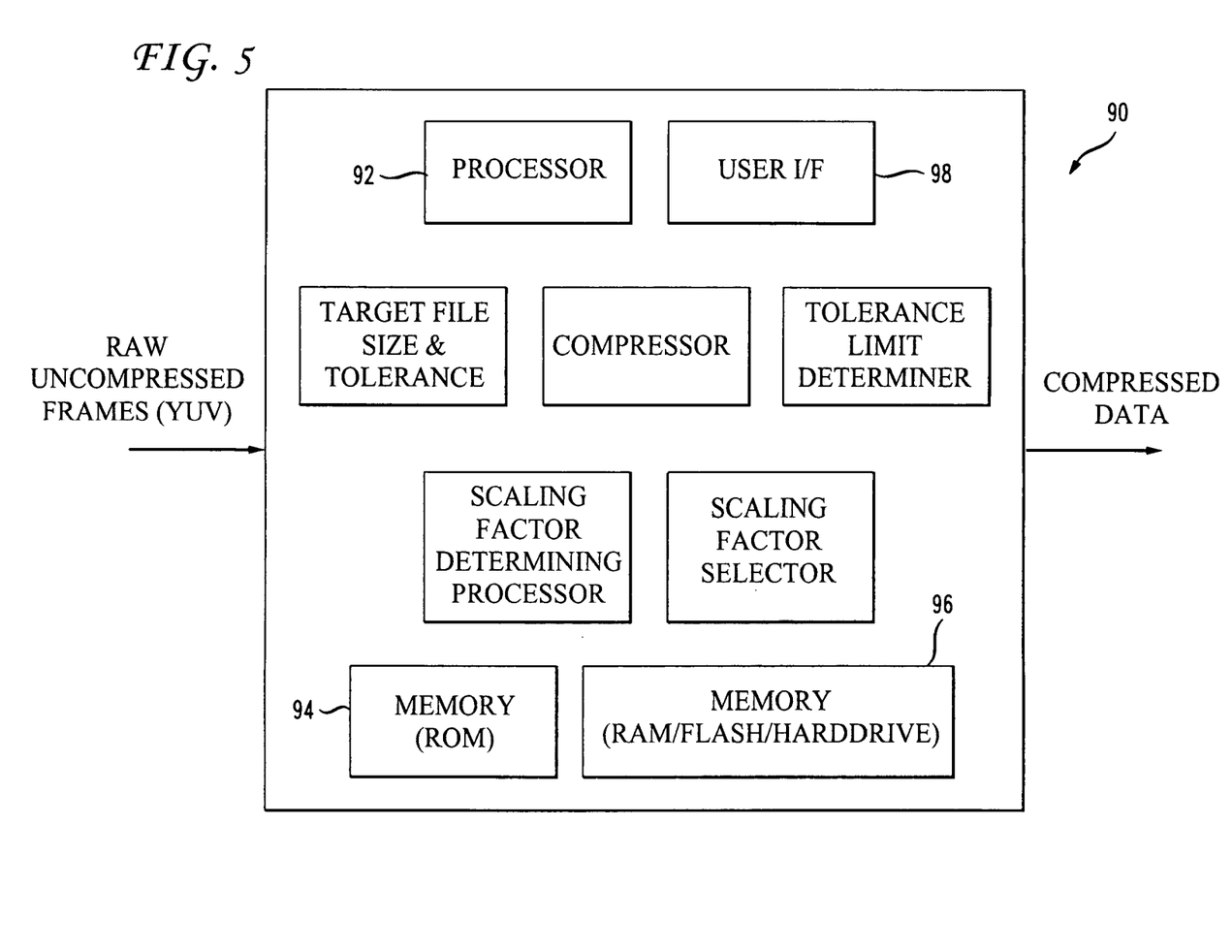
FIG. 5 is a block diagram of an exemplary system within which the present invention can be implemented

FIG. 5 shows a basic block diagram of a system 90 implementing the above described method of the invention. The system 90 includes a processor 92, and one or more ROM memories 94 and one or more RAM like memories 96. The ROM memory 94 can be pre-programmed to enable the processor 92 to perform the rate control of the present invention, or alternatively, the RAM memory 96 can be loaded with such instructions upon initialization. According to the preferred implementation, the input to system 90 is raw uncompressed frame (e.g. YUV frames), and the output is the compressed data in accordance with the above-described methods. Those of ordinary skill in the art will appreciate that the system 90 may also include a user input interface 98 of any known type (e.g., keyboard, mouse, touch screen, etc.) and a display device (not shown in FIG. 5) to enable user input for required parameters such as, for example, the initial specification of a target compressed file size and file size tolerance, in addition to selecting a quantization table, the current scaling factor and current down sampling factor.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method for rate control for compression of video frames in a sequence, the method comprising the steps of:
receiving a target compressed file size and file size tolerance;
compressing a subset of video frames in the sequence to obtain an estimate of compressed file size for all video frames in the sequence, wherein said compressing further comprises selecting a quantization table, a current scaling factor and a current downsampling factor for estimating said compressed file size for all frames in the sequence;
determining if an overall compressed file size is within a tolerance limit of said target compressed file size;
iteratively performing a scaling factor determination until the overall compressed file size is within the tolerance limit of said target compressed file size further comprising:
determining whether the target file size combined with the file size tolerance is less than the compressed file size, and when the determined target file size combined with the file size tolerance is less than the compressed file size,
setting a high file size to a compressed file size output from said step of compressing;
setting a low scaling factor to the current scaling factor; and
finding a lower bound step to produce a low file size and corresponding high scaling factor; and
selecting a scaling factor that results in a compressed file size approximating said target compressed file size.

2. A Method for rate control for compression of video frames in a sequence, the method comprising the steps of:
receiving a target compressed file size and file size tolerance;
compressing a subset of video frames in the sequence to obtain an estimate of compressed file size for all video frames in the sequence, wherein said compressing further comprises selecting a quantization table, a current scaling factor and a current downsampling factor for estimating said compressed file size for all frames in the sequence;
determining if an overall compressed file size is within a tolerance limit of said target compressed file size;
iteratively performing a scaling factor determination until the overall compressed file size is within the tolerance limit of said target compressed file size further comprising:
determining whether the target file size combined with the file size tolerance is less than the compressed file size, and when the determined target file size combined with the file size tolerance is greater than the compressed file size,
setting a low file size to a compressed file size output from said step of compressing;
setting a high scaling factor to the current scaling factor; and
finding an upper bound step to produce a high file size and corresponding low scaling factor; and
selecting a scaling factor that results in a compressed file size approximating said target compressed file size.

3. An apparatus for rate control for compression of video frames, the apparatus comprising:
circuitry that specifies a target compressed file size and file size tolerance;
a compressor that compresses a subset of a total number of video frames to obtain an estimate of compressed file size for all frames in a sequence, wherein said compressor selects a quantization table, a current scaling factor and a current downsampling factor for use in said compressing;
circuitry that determines if an overall compressed files size is within a tolerance limit;
a processor configured to iteratively perform a scaling factor determination when the overall compressed file size is not within the tolerance limit, wherein said processor is further configured to:
determine whether the target file size combined with the file size tolerance is less than the compressed file size, and when the determined target file size combined with the file size tolerance is less than the compressed file size,
set a high file size to a compressed file size output from said step of compressing;
set a low scaling factor to the current scaling factor; and
find a lower bound step to produce a low file size and corresponding high scaling factor; and
a selector to generate a scaling factor that results in a compressed file size as close to a target file size as possible.

4. An apparatus for rate control for compression of video frames, the apparatus comprising:
circuitry that specifies a target compressed file size and file size tolerance;

a compressor that compresses a subset of a total number of video frames to obtain an estimate of compressed file size for all frames in a sequence, wherein said compressor selects a quantization table, a current scaling factor and a current downsampling factor for use in said compressing;

circuitry that determines if an overall compressed files size is within a tolerance limit;

a processor configured to iteratively performing a scaling factor determination when the overall compressed file size is not within the tolerance limit, wherein said processor is further configured to:

determine whether the target file size combined with the file size tolerance is less than the compressed file size, and when the determined target file size combined with the file size tolerance is greater than the compressed file size, set a low file size to a compressed file size output from said step of compressing;

set a high scaling factor to the current scaling factor; and find an upper bound step to produce a high file size and corresponding low scaling factor; and a selector to generate a scaling factor that results in a compressed file size as close to a target file size as possible.

* * * * *